United States Patent
Kelly et al.

(12) 
(10) Patent No.: US 6,650,275 B1
(45) Date of Patent: Nov. 18, 2003

(54) IMAGE PROCESSING FOR HAZARD RECOGNITION IN ON-BOARD WEATHER RADAR

(75) Inventors: Wallace E. Kelly, Apex, NC (US); Timothy W. Rand, Cedar Rapids, IA (US); Serdar Uckun, Palo Alto, CA (US); Corinne C. Ruokangas, Woodside, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 35 days.

(21) Appl. No.: 09/954,105

(22) Filed: Sep. 17, 2001

(51) Int. Cl.[7] ............................................... G01S 13/95
(52) U.S. Cl. ..................... 342/26; 342/175; 342/176; 342/179; 342/182; 342/195
(58) Field of Search ............................... 342/26, 89, 90, 342/175–186, 192–197; 382/155–161

(56) References Cited

U.S. PATENT DOCUMENTS 6,035,057 A * 3/2000 Hoffman ..................... 382/159
6,278,799 B1 * 8/2001 Hoffman ..................... 382/159

* cited by examiner

Primary Examiner—Bernarr E. Gregory
(74) Attorney, Agent, or Firm—Nathan O. Jensen; Kyle Eppele

(57) ABSTRACT

A method of providing weather radar images to a user includes obtaining radar image data corresponding to a weather radar image to be displayed. The radar image data is image processed to identify a feature of the weather radar image which is potentially indicative of a hazardous weather condition. The weather radar image is displayed to the user along with a notification of the existence of the feature which is potentially indicative of the hazardous weather condition. Notification can take the form of textual information regarding the feature, including feature type and proximity information. Notification can also take the form of visually highlighting the feature, for example by forming a visual border around the feature. Other forms of notification can also be used.

18 Claims, 7 Drawing Sheets

IMAGE PROCESSING FOR HAZARD RECOGNITION IN ON-BOARD WEATHER RADAR

The U.S. Government has a paid-up license in this invention and the right in limited circumstances to require the patent owner to license others on reasonable terms as provided for by the terms of the contract number NCC1-290 awarded by the NASA.

FIELD OF THE INVENTION

The present invention relates to on-board weather radar for use on aircraft or other vehicles. More particularly, the present invention relates to methods and apparatus for rendering hazardous condition features more recognizable by pilots or the operators of other vehicles.

BACKGROUND OF THE INVENTION

Weather has been identified as a cause or contributing factor to nearly 25% of aviation accidents and 35% of fatalities. Accidents occur when a chain of events leads to a failure of an aircraft system, a mistake on part of the crew piloting the aircraft, or a combination thereof. Improved levels of weather information and the use of pilot decision aids may be helpful in breaking the chain of events that leads to an accident.

On-board weather radar is a tactical navigation aid that shows convective hazards for the next 15 to 30 minutes of flight. The on-board weather radar currently serves as the focus of a pilot's awareness of the weather situation. It provides a graphical depiction of precipitation relative to the aircraft's position. The presence of turbulence can be inferred from these reflections off of precipitation. Through the use of Doppler processing, turbulence can also be detected and displayed directly.

While the on-board weather radar has proven invaluable as a real-time source of tactical weather information, it has limitations. For example, there are features of weather radar images that indicate hazardous conditions may exist. Since some of these features occur infrequently, pilots may not be able to maintain proficiency in correctly interpreting these features. Since some of these features are short-lived (i.e., are only displayed for a short period of time), pilots may not notice the potential hazard and may not take appropriate action. A method of increasing the likelihood that a pilot will notice a potential hazard on the weather radar image, and thus take appropriate action, would be a significant improvement in the art.

SUMMARY OF THE INVENTION

A method of providing weather radar images to a user includes obtaining radar image data corresponding to a weather radar image to be displayed. The radar image data is image processed to identify a feature of the weather radar image which is potentially indicative of a hazardous weather condition. The weather radar image is displayed to the user along with a notification of the existence of the feature which is potentially indicative of the hazardous weather condition. Notification can take the form of textual information regarding the feature, including feature type and proximity information. Notification can also take the form of visually highlighting the feature, for example by forming a visual border around the feature. Other forms of notification can also be used.

DETAILED DESCRIPTION OF AN ILLUSTRATIVE EMBODIMENT

Figure 1:
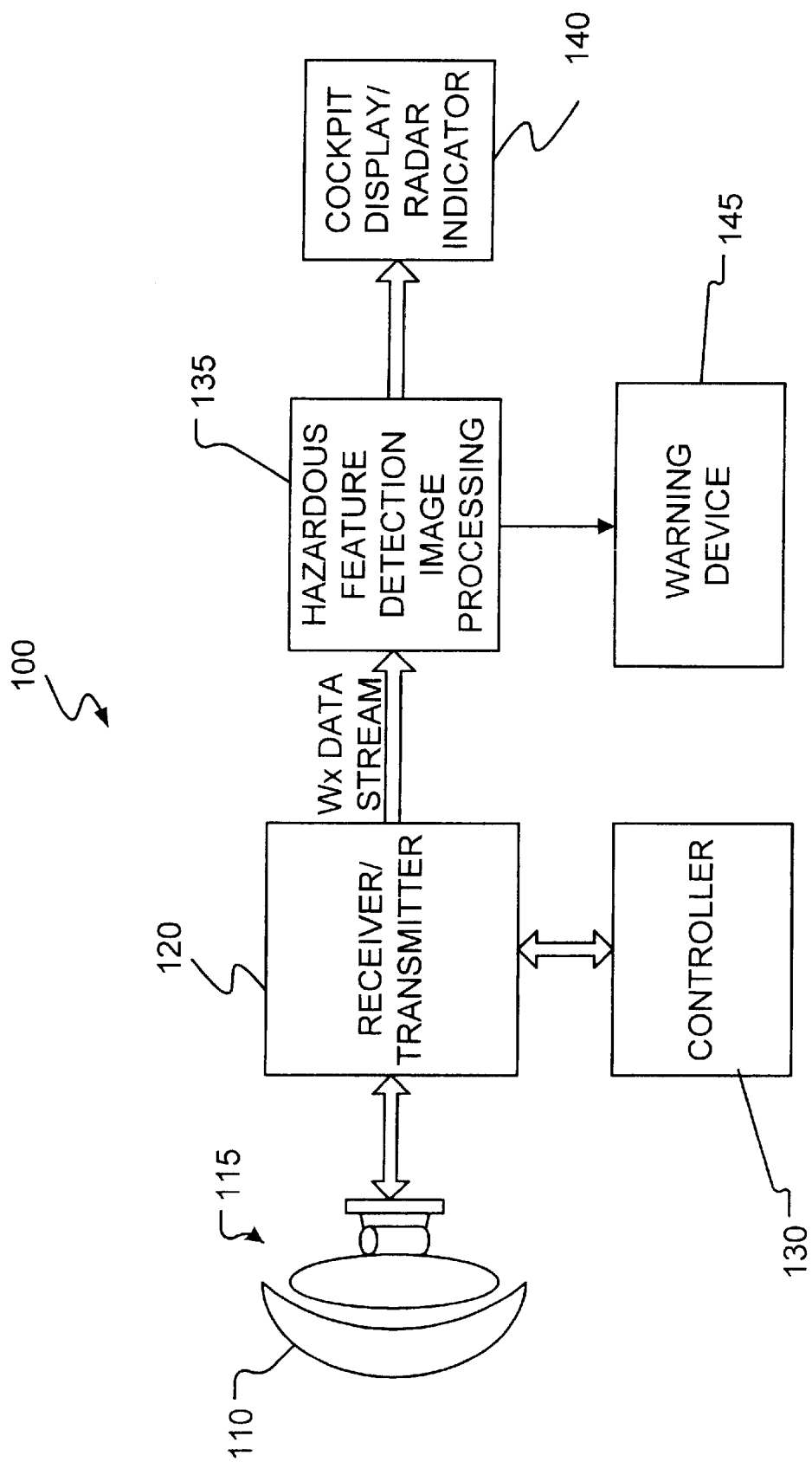
FIG. 1 is a block diagram illustrating an on-board weather radar system in accordance with the invention.

FIG. 1 is a block diagram illustrating a weather radar system 100 in accordance with the invention. System 100 includes radome 110, antenna (shown with mount) 115, receiver/transmitter 120, controller 130, hazardous feature image processor 135, radar indicator or display 140, and (optionally) warning device 145. Under the control of controller 130, receiver/transmitter 120 transmits a radar pulse through antenna 115 and radome 110 in one particular direction at a time. The radar pulse travels outward from the aircraft in the particular direction and reflects off of precipitation or other weather phenomena. As reflections come back and are received by antenna 115 and receiver/transmitter 120, an indication of the weather at different distances (out to a range) along a straight line in the particular direction can be ascertained.

The data that is received by receiver/transmitter 120 is put into a data stream and provided to image processor 135. As antenna 115 sweeps back and forth, data for hundreds of these "radials" are obtained every sweep, thus providing a complete picture of the weather in front of the aircraft. A radial can be defined as weather radar information along a line, out to a range, for a given tilt angle and scan angle from the aircraft as is known in the art. Image processor 135 receives from the data stream radar image data corresponding to a weather radar image to be displayed on radar indicator or display device 140. The radar image data can be in any of a wide variety of formats, such as bitmaps for example In a conventional weather radar system, the data stream containing the radar image data corresponding to a weather radar image to be displayed is provided directly to radar indicator 140 for use in displaying the weather radar image to the pilot of the aircraft or operator of the vehicle. However, there are features of weather radar images that indicate hazardous conditions may exist, but which occur relatively infrequently. Because these features occur infrequently, pilots may not be able to maintain proficiency in correctly interpreting these features. Further, some of these features are short-lived, and pilots may not notice the potential hazard on the radar indicator in time. Because of the short-lived nature of some features, and the infrequency of others, the pilot's situational awareness is less than optimal, sometimes resulting in a failure to take appropriate action.

In order to improve the situational awareness of the pilot, in the present invention the weather radar data stream corresponding to a weather radar image to be displayed on radar indicator 140 is provided to image processor 135 for hazard identification. Image processor 135 implements image processor algorithms to identify features which may indicate hazardous conditions. These features can include, for example, squall lines, hooks, steep gradients, scalloped edges, pendant shapes, fingers, horse-shoe shapes, and other types. Once identified, the weather radar image is displayed by radar indicator 140, and the pilot or other user is notified of the existence of the feature which is potentially indicative of the hazardous weather condition.

The image processing algorithms implemented by processor 135 for hazard identification can utilize different image processing procedures and techniques of the type which are known in the art. For example, the image processing algorithms can use image processing procedures for two dimensional Fourier transforms, median filtering, edge detection, morphology, neural network implementation, and/or thresholding. In image processing, procedures such as these are used for feature extraction. The extracted features are then used in a classification or pattern recognition stage. Procedures for doing pattern recognition include: maximum likelihood, discriminant functions, and neural network implementation procedures. Further discussions of known image processing techniques and procedures can be found, for example, in the following texts: (1) Two-dimensional Signal and Image Processing, by Jae S. Lim (Prentice Hall, ISBN: 139353224); (2) Mathematical Morphology in Image Processing, by Edward Dougherty (editor) and Marcel Dekker (ISBN: 0824787242); (3) Neural Networks for Vision and Image Processing, by Gail A. Carpenter and Stephen Grossberg (MIT Press; ISBN: 0262531089); and (4) Pattern Classification, by Richard O. Duda, Peter E. Hart and David G. Stork (John Wiley & Sons, ISBN: 471056693). The present invention is not limited to any particular image processing technique chosen for identifying hazardous features in a weather radar image.

Figure 2:
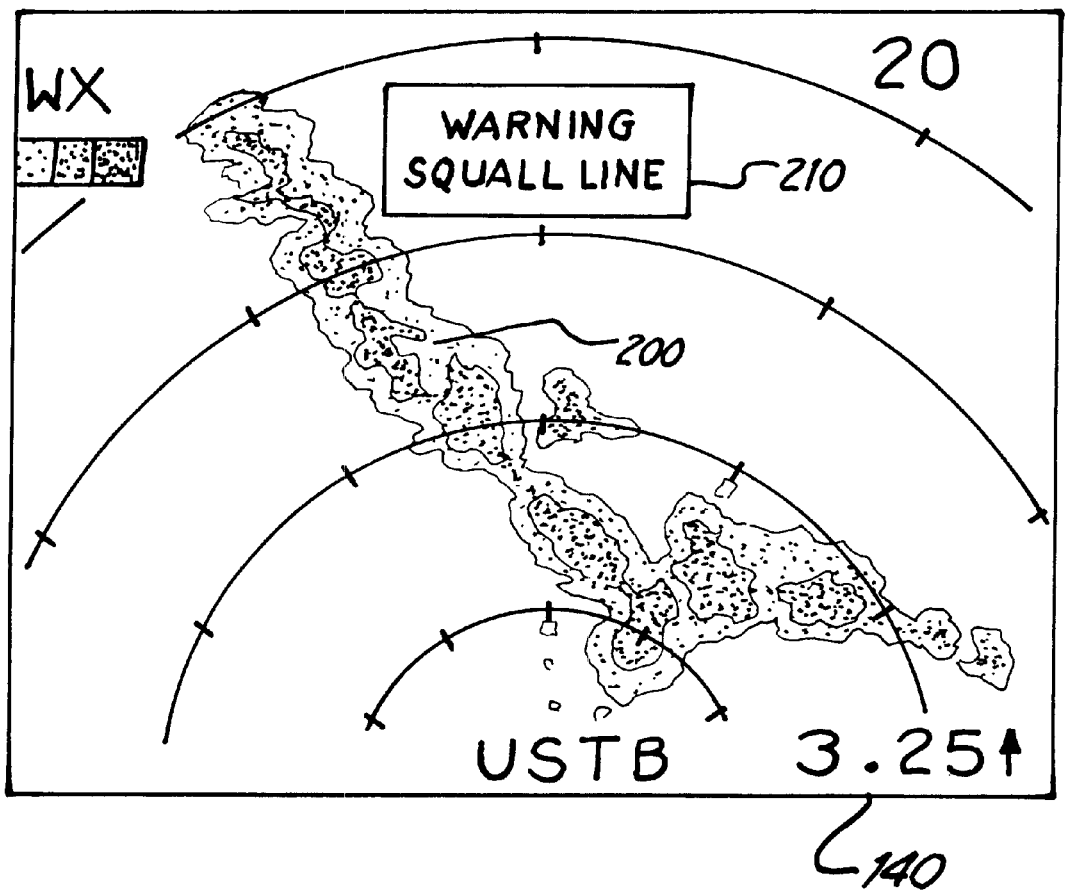
FIG. 2 is an illustration of the radar indicator of FIG. 1, illustrating a "squall line" hazardous weather condition feature and warning.

After image processing to identify a feature of the weather radar image which is potentially indicative of a hazardous weather condition, a wide variety of methods can be used to notify the user of the existence of the feature. In numerous embodiments described below with reference to FIGS. 2–8, the pilot or user is notified by displaying the weather radar image on radar indicator 140 with added emphasis of the feature. In some embodiments, this includes adding to the weather radar image a text warning of the existence of the feature. This can include, for example, displaying a name of the type of the feature. For example, upon the identification of a squall line feature 200 as shown in FIG. 2, the text warning 210 which reads "WARNING SQUALL LINE" can be displayed. The text warning of the existence of the feature can also include proximity information indicative of a position of the hazardous weather condition. For example, referring for the moment to FIG. 7, a text warning 710 which reads "WARNING HORSE-SHOE SHAPED HAZARD RANGE: 120 MILES" can be displayed. Further, as is also illustrated in FIG. 7, the text warning can also include potential implications of the hazardous feature detected. For example, the text warning can also include more specific information indicating the type of weather (e.g., convection, hail, drafts, etc) commonly seen around the particular storm feature. In FIG. 7, the text warning for the horse-shoe shaped hazard includes the weather implications specific warning "TURBULENCE, THUNDERSTORMS AND HAIL".

In some embodiments, either instead of or in conjunction with the display of a text warning, the radar image is displayed to the user with added visual emphasis of the hazardous condition feature by displaying the weather radar image with a visual border formed around the feature. The visual border can be a solid border, a non-continuous border, a flashing border, or other types of borders to highlight the location of the hazardous feature. Any text warning combined with the border can be positioned inside the border, or outside of the border.

In addition to text warnings and visual borders, other embodiments of the present invention include other methods of adding emphasis to the feature in the weather radar image, as compared to a standard weather radar image in which the feature is illustrated but not emphasized. For example, the existence of a hazard indicating feature could be highlighted by causing an icon to vary in a visually distinctive manner. Alternatively, the feature itself can be caused to vary in a manner which is not typical in a conventional weather radar image. For example, the feature itself could be caused to flash by varying the intensity repeatedly.

In yet other embodiments, notifying the user of the existence of the feature of the weather radar image which is potentially indicative of the hazardous weather condition is achieved using an optional warning device 145. Warning device 145 can be a non-visual warning device in some embodiments of the invention. For example, warning device 145 can include a speaker for generating an audible tone once image processing circuitry 135 detects the hazardous feature in the weather radar image. Other non-visual warning devices could also be used. Further, warning device 145 can include visual warning devices which are separate from radar indicator 140. For example, warning device 140 could include a flashing warning light.

FIGS. 2–8 illustrate cockpit display device or radar indicator 140 displaying hazardous condition enhanced weather radar imagery in accordance with various embodiments of the present invention. These FIGS. illustrate various hazardous weather condition features which can be detected, as well as a variety of formats for notifying or warning the pilot or user of the existence of the hazardous features. It must be noted that the present invention is not limited to the particular hazardous features illustrated, nor to the specific warning formats used with particular hazardous features. For example, the warning format used for one particular hazardous feature can be applied to another hazardous feature, or the warning formats can be combined and revised in numerous different fashions.

Referring again to FIG. 2, radar indicator 140 is shown illustrating feature 200 indicative of a squall line. A continuous line of storm cells, such as this, is generally impenetrable, and a detour of an aircraft around this type of area is recommended. Using image processing circuitry 135 to detect hazardous squall line feature 200, text warning 210 is generated and displayed. Text warning 210 can be in whatever color is determined to be most visually distinguishable. Further, text warning 210 can be continuous or flashing. In the illustrated example, text warning 210 is surrounded by a border, but this need not be the case.

Figure 3:
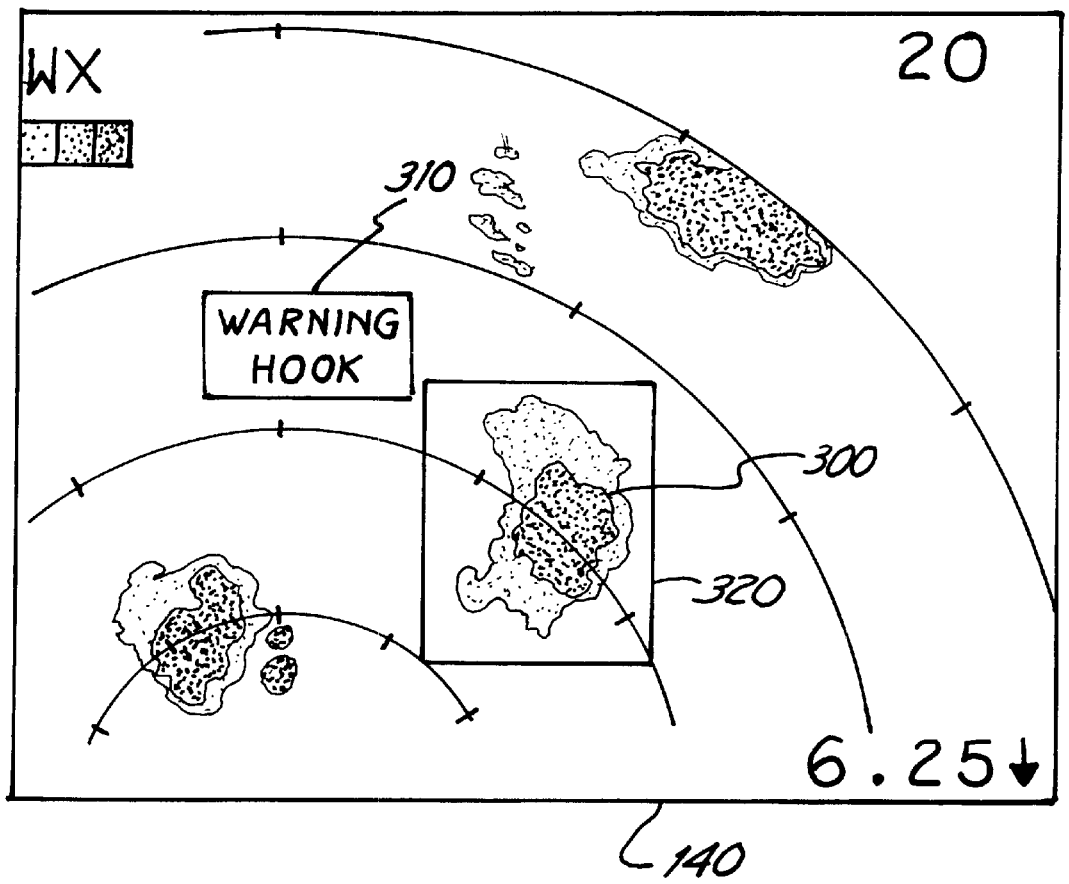
FIG. 3 is an illustration of the radar indicator of FIG. 1, illustrating a "hook" hazardous weather condition feature and warning.

FIG. 3 illustrates radar indicator 140 displaying a weather radar image including a hook feature 300. Hook feature 300, at approximately 30° right of center and approximately 7 miles, out suggests the presence of hail and turbulence. In the embodiment illustrated in FIG. 3, hook feature 300 is emphasized using both a text warning 310 and a visual border 320. Once again, the text and border can be in any of a wide variety of formats.

Figure 4:
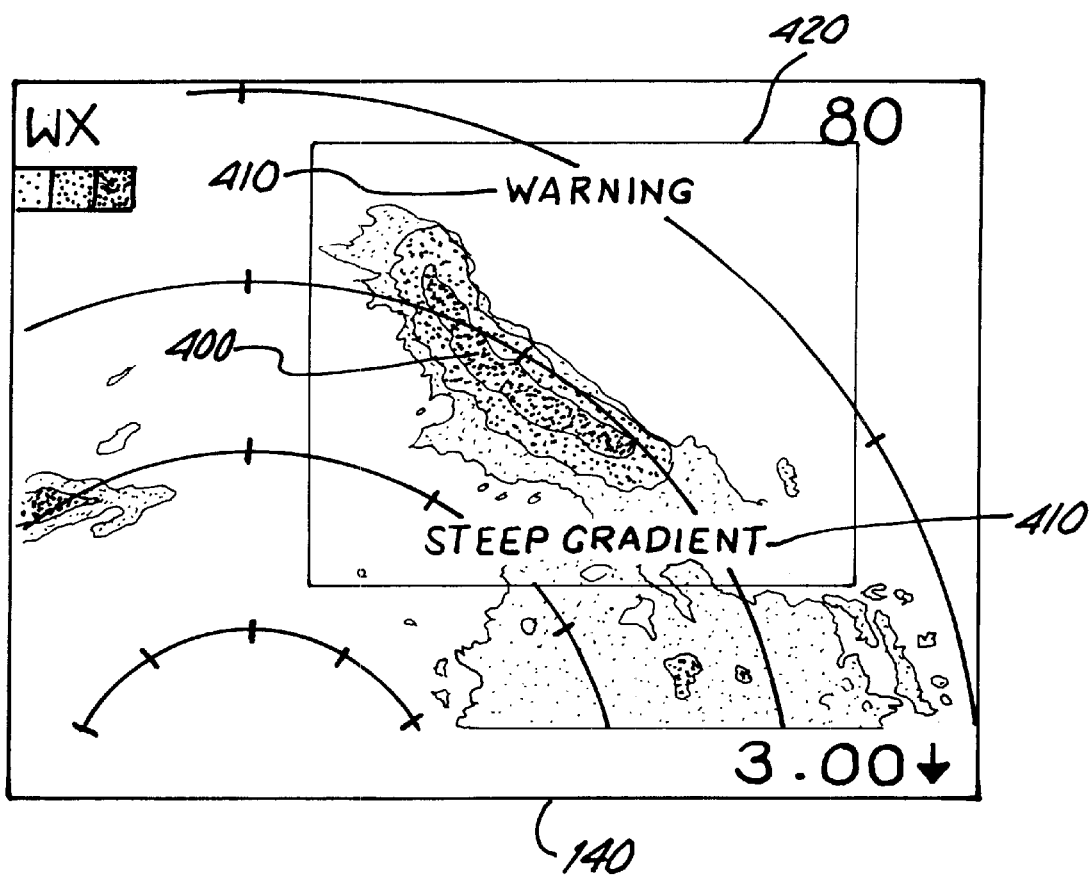
FIG. 4 is an illustration of the radar indicator of FIG. 1, illustrating a "steep gradient" hazardous weather condition feature and warning.

FIG. 4 is an illustration of radar indicator 140 displaying a feature 400 indicative of a steep gradient hazardous weather condition. This storm cell indicates a large area of heavy precipitation surrounded by small areas of moderate precipitation. This type of activity commonly includes severe turbulence. Further, the lack of returns displayed behind this feature may indicate possible attenuation of the radar pulses.

Using image processing in accordance with the invention, feature 400 indicative of the potential presence of a hazardous weather condition is visually emphasized using both a text warning 410 and a visual border 420. In this particular embodiment, the text warning is located within border 420, instead of outside of the border. Further, in this particular embodiment, the text warning is shown in two separate sections at the top and bottom of the bordered area.

Figure 5:
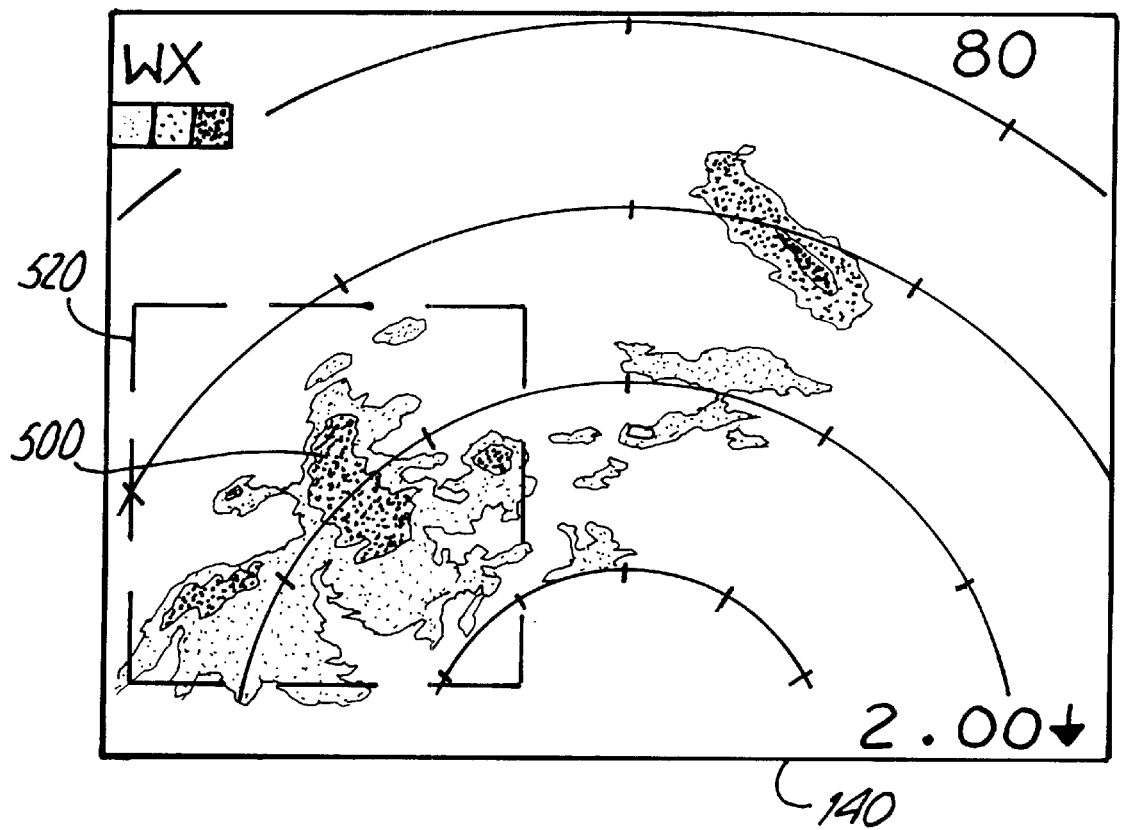
FIG. 5 is an illustration of the radar indicator of FIG. 1, illustrating a "scalloped edge" hazardous weather condition feature and warning.

FIG. 5 illustrates radar indicator 140 displaying a weather radar image including a feature 500 indicative of a condition sometimes referred to as a scalloped edge. This type of feature is indicative of heavy turbulence and possibly hail. In the embodiment illustrated in FIG. 5, radar indicator 140 provides a mode of visual emphasis of feature 500 which includes only a visual border 520, but not a text warning. Also, for purposes of illustrating the wide variety of different visual notification formats that can be used, border 520 is a non-continuous border.

Figure 6:
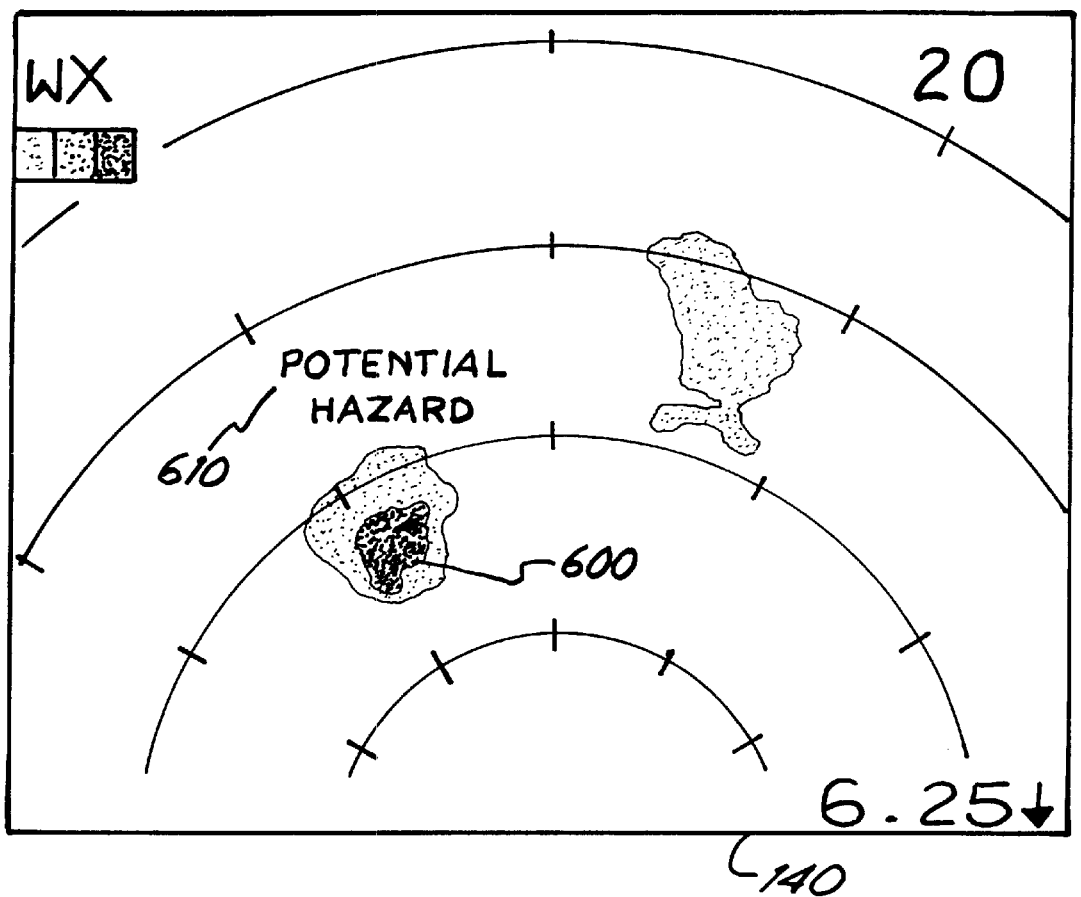
FIG. 6 is an illustration of the radar indicator of FIG. 1, illustrating a "finger" hazardous weather condition feature and warning.
Figure 7:
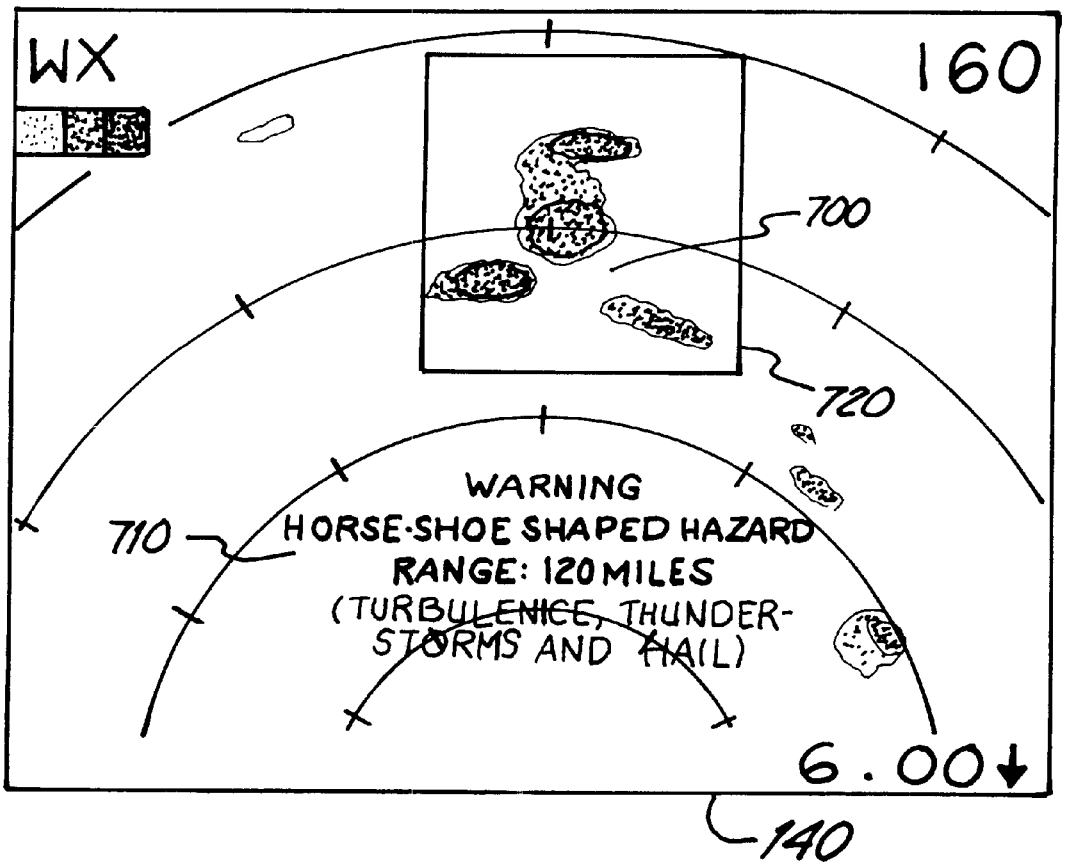
FIG. 7 is an illustration of the radar indicator of FIG. 1, illustrating a "horse-shoe shape" hazardous weather condition feature and warning.

FIG. 6 illustrates radar indicator 140 displaying a feature 600 indicative of a hazardous condition known as a "finger". The particular shape of the feature 600 has been associated with thunderstorms and hail. In the particular embodiment illustrated in FIG. 6, after identification by image processor 135, the weather radar image is altered to display text warning 610. In this particular embodiment, text warning 610 indicates "POTENTIAL HAZARD", but does not specify the name of the hazard. Further, in this non-limiting example, no borders are used.

FIG. 7 illustrates radar indicator 140 displaying a hazardous condition feature 700 which is indicative of a weather phenomena frequently referred to as a horse-shoe shaped hazard.

This type of hazard suggests severe turbulence, thunderstorms and hail. In the embodiment illustrated in FIG. 7, feature 700 is emphasized using both a text warning 710 and a visual border 720. In this particular embodiment, text warning 710, which reads "WARNING HORSE-SHOE SHAPED HAZARD RANGE: 120 MILES (TURBULENCE, THUNDERSTORMS AND HAIL)", provides an indication of the proximity or position of the hazardous weather condition as well as the associated weather implications. The text warning could also provide an indication of the direction of the hazard relative to the aircraft.

Although the present invention has been described with reference to illustrative embodiments, workers skilled in the art will recognize that changes may be made in form and detail without departing from the spirit and scope of the invention.

What is claimed is:

1. A method of providing weather radar images to a user, the method comprising:
   obtaining radar image data corresponding to a weather radar image to be displayed to the user, wherein such obtaining includes
   transmitting from a receiver/transmitter a different radar pulse in each of a plurality of different directions,
   receiving radar pulses reflected off of weather phenomena, and
   generating the radar image data from the received radar pulses;
   image processing the radar image data to identify a feature of the weather radar image which is potentially indicative of a hazardous weather condition;
   displaying the weather radar image to the user, including displaying on the weather radar image a text warning, adjacent the display of the feature, apprising the user of the existence of the feature; and
   notifying the user of the existence of the feature of the weather radar image which is potentially indicative of the hazardous weather condition, such notifying including displaying the weather radar image to the user with added emphasis of the feature of the weather radar image.

2. The method of claim 1, wherein displaying on the weather radar image the text warning of the existence of the feature further comprises displaying proximity information indicative of a position of the hazardous weather condition.

3. The method of claim 2, wherein displaying the proximity information further comprises displaying range information indicative of a distance between the receiver/transmitter and the hazardous weather condition.

4. The method of claim 3, wherein displaying the proximity information further comprises displaying an indication of actual weather implied by the feature.

5. The method of claim 1, wherein displaying the text warning of the existence of the feature further comprises displaying on the weather radar image a name of a type of the feature.

6. The method of claim 1, wherein displaying the radar image to the user with added emphasis of the feature further comprises displaying the weather radar image with a visual border formed around the feature.

7. The method of claim 1, wherein notifying the user of the existence of the feature of the weather radar image which is potentially indicative of the hazardous weather condition further comprises generating an audible warning of the existence of the feature.

8. A weather radar system comprising:
   receiver/transmitter circuitry configured to transmit a different radar pulse in each of a plurality of different directions, to receive radar pulses reflected off of weather phenomena, and to generate radar image data from the received radar pulses;
   image processing circuitry configured to receive the radar image data and to identify a feature of a corresponding weather radar image which is potentially indicative of a hazardous weather condition, the image processing circuitry providing as an output image processed radar image data, the image processing circuitry configured to provide the image processed radar image data such that the display device displays the weather image with added emphasis of the feature of the weather radar image, the image processing circuitry further configured to provide the image processed radar image such that the display device displays the weather radar image data so that it includes, adjacent the display of the feature, a text warning of the existence of the feature; and
   a display device coupled to the image processing circuitry and configured to display the weather radar image combined with a notification of the existence of the feature which is potentially indicative of the hazardous weather condition.

9. The weather radar system of claim 8, wherein the image processing circuitry is configured to provide the image processed radar image data such that the display device displays with the weather radar image textual proximity information indicative of a position of the hazardous weather condition.

10. The weather radar system of claim 9, wherein the image processing circuitry is configured to provide the image processed radar image data such that the display device displays with the weather radar image textual range information indicative of a distance between the weather radar system and the hazardous weather condition.

11. The weather radar system of claim 8, wherein the image processing circuitry is configured to provide the image processed radar image data such that the display device displays the weather radar image combined with a name of the hazardous weather condition.

12. The weather radar system of claim 8, wherein the image processing circuitry is configured to provide the image processed radar image data such that the display device displays the weather radar image with added emphasis of the feature of the weather radar image by displaying a visual border around the feature.

13. The weather radar system of claim 8, and further comprising a non-visual warning device coupled to the image processing circuitry and configured to generate a non-visual warning of the existence of the feature.

14. The weather radar system of claim 13, wherein the non-visual warning device includes a speaker which generates an audible warning of the existence of the feature.

15. A weather radar system comprising:

receiver/transmitter circuitry configured to transmit a different radar pulse in each of a plurality of different directions, to receive radar pulses reflected off of weather phenomena, and to generate radar image data from the received radar pulses;

image processing circuitry configured to receive the radar image data and to identify a feature of a corresponding weather radar image which is potentially indicative of a hazardous weather condition, the image processing circuitry providing as an output image processed radar image data, the image processing circuitry configured to provide the image processed radar image data such that the display device displays the weather radar image with added emphasis of the feature of the weather radar image, the image processing circuitry further configured to provide the image processed radar image data such that the display device displays the weather radar image with added emphasis of the feature of the weather radar image by displaying a visual border around the feature; and a display device coupled to the image processing circuitry and configured to display the weather radar image combined with a notification of the existence of the feature which is potentially indicative of the hazardous weather condition.

16. The weather radar system of claim 15, and further comprising a non-visual warning device coupled to the image processing circuitry and configured to generate a non-visual warning of the existence of the feature.

17. The weather radar system of claim 16, wherein the non-visual warning device includes a speaker which generates an audible warning of the existence of the feature.

18. The weather radar system of claim 15, wherein the visual border is discontinuous.

* * * * *